US012488927B2

(12) United States Patent
Michalski et al.

(10) Patent No.: US 12,488,927 B2
(45) Date of Patent: Dec. 2, 2025

(54) REINFORCED TRANSFORMER CORE FRAME AND MANUFACTURING METHOD

(71) Applicant: HITACHI ENERGY LTD, Zürich (CH)

(72) Inventors: Lukasz Michalski, Lodz (PL); Pawel Klys, Lodz (PL); Robert Daszkiewicz, Lodz (PL); Adam Stelmasiak, Lodz (PL)

(73) Assignee: HITACHI ENERGY LTD, Zürich (CH)

( * ) Notice: Subject to any disclaimer, the term of this patent is extended or adjusted under 35 U.S.C. 154(b) by 1187 days.

(21) Appl. No.: 17/178,407

(22) Filed: Feb. 18, 2021

(65) Prior Publication Data

US 2021/0350967 A1 Nov. 11, 2021

(30) Foreign Application Priority Data

May 6, 2020 (EP) .................................... 20173263

(51) Int. Cl.
*H01F 27/24* (2006.01)
*H01F 27/06* (2006.01)
*H01F 27/32* (2006.01)

(52) U.S. Cl.
CPC ............. *H01F 27/06* (2013.01); *H01F 27/24* (2013.01); *H01F 27/327* (2013.01)

(58) Field of Classification Search
CPC ........ H01F 27/06; H01F 27/24; H01F 27/327; H01F 27/12; H01F 27/263
See application file for complete search history.

(56) References Cited

U.S. PATENT DOCUMENTS 3,769,767 A 11/1973 Scott
3,789,337 A * 1/1974 Sheppard .............. H01F 27/303 336/60
4,890,086 A * 12/1989 Hill ........................ H01F 27/263 29/606
4,931,340 A 6/1990 Baba et al.
5,445,861 A 8/1995 Newton et al.
8,970,338 B2 3/2015 Johnson
2004/0126537 A1* 7/2004 Jackson .................. E04C 2/365 156/290

FOREIGN PATENT DOCUMENTS

CA 1321130 C * 8/1993 ............... B32B 3/12
CN 106128772 B 11/2016
CN 205959743 U * 2/2017
CN 206432125 U * 8/2017
CN 207116182 U * 3/2018
EP 3319095 A1 5/2018
KR 101899074 B1 9/2018
WO 2012/103078 A1 8/2012

OTHER PUBLICATIONS

Extended European Search Report mailed Sep. 22, 2020 for European Patent Application No. 20173263.3, 5 pages.

* cited by examiner

*Primary Examiner* — Tuyen T Nguyen
(74) *Attorney, Agent, or Firm* — Sage Patent Group

(57) ABSTRACT

A transformer core frame is provided with a reinforcement structure to form a reinforced transformer core frame. The reinforcement structure comprises one or several reinforcement panels comprising a honeycomb structure and affixed to the transformer core frame. A method of producing a reinforced transformer core frame is also described.

16 Claims, 5 Drawing Sheets

REINFORCED TRANSFORMER CORE FRAME AND MANUFACTURING METHOD

CROSS-REFERENCE TO RELATED APPLICATIONS

This application claims priority to European Patent Application No. 20173263.3 filed on May 6, 2020, the disclosures and content of which are incorporated by reference herein in their entirety.

FIELD OF THE INVENTION

The invention relates to transformers and, more particularly, to supports for cores of transformers.

BACKGROUND OF THE INVENTION

A frame for a core of a distribution transformer serves the purpose of clamping and compressing top and bottom yokes of the core, thereby holding the core together.

U.S. Pat. No. 8,970,338 B1 discloses an exemplary distribution transformer having a slot-and-tab core frame assembly. The transformer core frame encloses a transformer core having at least one phase and provides compression on the core yokes and end members of the transformer to bind the assembly together. While U.S. Pat. No. 8,970,338 B1 provides an advantageous and cost-efficient construction of a transformer core frame, alternative constructions of core frame that enclose a transformer core along top, bottom, and at least two sides are known.

It has been found that conventional transformer core frames tend to exhibit cracks on the shorter sides of the transformer core frame when short circuit testing is performed for wound core transformers.

In order to mitigate the risk of crack formation during short circuit testing, reinforcement structures may be used. For illustration, solid steel plates may be mounted (e.g., by welding) to the short sides of the transformer core frame to mitigate the risk of crack formation during short circuit tests. However, in order to provide adequate strength to mitigate the risk of crack formation, the steel plates must have a thickness that significantly adds to the weight of the transformer core.

SUMMARY

There is a need to provide improved techniques for reducing the risk of crack formation in transformer core frames during short circuit testing. There is in particular a need for techniques that mitigate the risk of crack formation in transformer core frames, but lead to a lower weight increase as compared to the use of solid steel reinforcement plates welded to the sides of a metal transformer core frame and/or are easier to manufacture.

According to embodiments of the invention, a transformer core frame reinforcement is provided by use of reinforcement panels including a structure that defines a plurality of cells. The structure that defines the plurality of cells may be a honeycomb structure. The reinforcement panels may be composite panels having the structure that defines a plurality of cells and one or two skin layers adhered thereto. High stiffness of the reinforced transformer core frame can be obtained with relatively low weight increase and simple process approach.

The reinforcement panels may be pre-fabricated panels that can be attached to the transformer core frame as an integral unit, such as by riveting, bolting, welding or gluing. Thus, the reinforced transformer core frame can be efficiently manufactured.

The transformer core frame mitigates the effect of electrodynamic forces exerted from an active part to a tank wall, thereby mitigating the risk of crack formation when short circuit testing is performed.

A reinforced transformer core frame according to an embodiment comprises a transformer core frame and a reinforcement structure. The reinforcement structure comprises one or several reinforcement panels comprising a structure that defines a plurality of cells, such as a honeycomb structure, and affixed to the transformer core frame.

The structure that defines the plurality of cells may be a honeycomb structure, an undulated structure, or another structure that defines a plurality of cells and that abuts on an inner face of at least one skin layer.

The one or several reinforcement panels are adapted to mitigate the risk of crack formation when short circuit testing is performed.

The transformer core frame may be made of steel.

The transformer core frame may have a first side wall, a second side wall, and a bottom wall.

The reinforcement panel(s) may be selectively affixed to one or more of: the first and/or second side wall, the bottom wall, and/or a top wall of the transformer core frame.

One or several first reinforcement panel(s) comprising a honeycomb structure may be affixed to the top wall.

One or several first reinforcement panel(s) comprising a honeycomb structure may be affixed to the bottom wall.

One or several first reinforcement panel(s) comprising a honeycomb structure may be affixed to the first side wall.

One or several second reinforcement panel(s) comprising a honeycomb structure may be affixed to the second side wall.

The first reinforcement panel(s) may be affixed to an inner surface of the first side wall (i.e., to the surface facing towards the wound core).

The second reinforcement panel(s) may be affixed to an inner surface of the second side wall (i.e., to the surface facing towards the wound core).

When the reinforcement panel(s) are affixed to the inner surfaces of the side walls, at least one skin layer and/or the honeycomb structure of the reinforcement panel(s) may be made of an electrically insulating material to provide electrical insulation.

The first reinforcement panel(s) and/or the second reinforcement panel(s) may abut on an inner surface of the bottom wall (i.e., on the surface facing towards the wound core) and/or on an inner surface of the top wall (i.e., on the surface facing towards the wound core).

The first reinforcement panel(s) and/or the second reinforcement panel(s) may be affixed to the inner surface of the bottom wall and/or the inner surface of the top wall.

The first reinforcement panel(s) may be affixed to an outer surface of the first side wall (i.e., to the surface facing away from the wound core).

The second reinforcement panel(s) may be affixed to an outer surface of the second side wall (i.e., to the surface facing away from the wound core).

Reinforcement panel(s) comprising a honeycomb core may be attached to the inner or outer surfaces of the bottom and top walls of the transformer core frame.

Each of the one or several reinforcement panels may comprise at least one skin layer adhered to the honeycomb structure.

Each of the one or several reinforcement panels may be a composite panel, in particular a composite panel having a sandwich structure.

The honeycomb structure may comprise or may be formed of at least one of: aluminum, stainless steel, Nomex®, Kevlar®, polypropylene, polycarbonate.

The at least one skin layer comprises or is formed of at least one of: aluminum, stainless steel, high pressure laminate, glass/epoxy prepreg, fiberglass.

The at least one skin layer may be adhered to the honeycomb structure using an adhesive that is commercial grade toughened epoxy or modified epoxy film adhesive.

The one or several reinforcement panels respectively may be a composite sandwich panel comprising first and second skin layers, with the honeycomb structure sandwiched between the first and second skin layers.

Each of the one or several reinforcement panels may have only one skin layer arranged such that the honeycomb structure is sandwiched between the skin layer and the transformer core frame.

The one or several reinforcement panels may be affixed to the transformer core frame by rivets.

The one or several reinforcement panels may be affixed to the transformer core frame by bolts.

The one or several reinforcement panels may be affixed to the transformer core frame using an adhesive.

The one or several reinforcement panels may be affixed to the transformer core frame by welds.

The transformer core frame may have a top wall.

The first and second side walls may define the shorter side walls of the transformer core frame.

The first and second side walls may each have a length (measured in a vertical direction for the side walls) that is shorter than a length of the bottom and top walls (measured in a horizontal direction for the bottom and top walls).

The first side wall and second side wall may respectively have a planar major portion and integral bent edge portions that extend transversely to the planar major portion along the vertical edges of the planar major portion.

The bottom wall and/or top wall may respectively have a planar major portion and integral bent edge portions that extend transversely to the planar major portion along the horizontal edges of the planar major portion.

The top wall may be attached to the side walls by screws or bolts.

The bottom wall and the first and second side wall(s) may be integrally formed or may be attached to each other.

The reinforced transformer core frame may be adapted to receive a wound core therein.

The reinforced transformer core frame may be adapted to clamp and compress top and bottom yokes of the core.

The honeycomb structure of the reinforcement panel(s) has walls defining a plurality of cells. The walls extend along an axis and have a hexagonal shape in plan view along the axis.

The reinforcement panels may be attached to the transformer core frame such that the axis along which the cells, e.g., the honeycomb cells extend is transverse, in particular normal to, a major surface of the side wall, bottom wall, or top wall of the transformer core frame to which the reinforcement panel is affixed.

The walls of the structure that defines a plurality of cells, such as the honeycomb structure may have fluid communication openings. The fluid communication openings may be operative to allow an insulation liquid, in particular insulation oil, to pass through the fluid communication openings. The fluid communication openings may be operative to allow gas, in particular air, to leave the cells.

The fluid communication openings may comprise first fluid communication openings that fluidly communicate adjacent cells of the honeycomb structure of a reinforcement panel and that are provided in internal walls of the honeycomb structure.

The fluid communication openings may comprise second fluid communication openings that are adapted to fluidly communicate cells of the honeycomb structure of a reinforcement panel with cells of the honeycomb structure of another reinforcement panel or with a liquid-containing volume of a transformer tank.

Cells of the honeycomb structure of the reinforcement panel(s) may be filled with a liquid. The liquid may be an insulation liquid, such as an insulation oil. The liquid may be an insulation liquid contained in a transformer tank in which the reinforced transformer core frame is submerged.

A transformer according to an embodiment of the invention comprises a wound core and the reinforced transformer core frame of any one of the preceding claims that surrounds the wound core and on which the wound core is supported.

The transformer may comprise a transformer tank containing an insulation liquid.

The reinforcement panel(s) of the reinforced transformer core frame may be partially or fully submerged in the insulation liquid.

The transformer may be a power transformer for an electric power transmission and/or distribution system.

The transformer may be a traction transformer.

The transformer may be a distribution transformer.

The transformer may be a transformer having a rating of at least 6 kVA, at least 15 kVA, or at least 25 kVA.

The transformer may have a rating of at least 200 kVA, at least 300 kVA, or at least 400 kVA.

The transformer may include a fluid.

The fluid may be at least one of the following: mineral oil, dimethyl silicone, esters and synthetic hydrocarbons.

The fluid may be contained both within a transformer tank volume surrounding the reinforcement panel(s) and within cells of the honeycomb structure of the reinforcement panel(s).

The transformer may be a single-phase transformer.

The transformer may have plural phases.

An electric power transmission and/or distribution system according to an embodiment comprises the transformer according to any one of the embodiments disclosed herein.

A method of producing a reinforced transformer core frame according to an embodiment comprises affixing one or several reinforcement panels to a transformer core frame, wherein each of the one or several reinforcement panels comprises a structure that defines a plurality of cells, such as a honeycomb structure.

The reinforced transformer core frame may be the reinforced transformer core frame according to any one of the embodiments disclosed herein.

Each of the one or several reinforcement panels may be a pre-fabricated panel that may be affixed to the transformer core frame as an integral unit.

Affixing the reinforcement panel(s) to the transformer core frame may comprise riveting the reinforcement panel(s) to the transformer core frame.

Affixing the reinforcement panel(s) to the transformer core frame may comprise bolting the reinforcement panel(s) to the transformer core frame.

Affixing the reinforcement panel(s) to the transformer core frame may comprise welding the reinforcement panel(s) to the transformer core frame.

Affixing the reinforcement panel(s) to the transformer core frame may comprise gluing the reinforcement panel(s) to the transformer core frame.

The reinforcement panel(s) may be selectively affixed to one or more of: first and/or second side walls, a bottom wall and/or a top wall of the transformer core frame.

Affixing the reinforcement panel(s) to the transformer core frame may comprise affixing reinforcement panel(s) to the top wall.

Affixing the reinforcement panel(s) to the transformer core frame may comprise affixing reinforcement panel(s) to the bottom wall.

Affixing the reinforcement panel(s) to the transformer core frame may comprise affixing first reinforcement panel(s) to an inner surface of the first side wall.

Affixing the reinforcement panel(s) to the transformer core frame may comprise affixing second reinforcement panel(s) to an inner surface of the second side wall.

Affixing the first reinforcement panel(s) and/or the second reinforcement panel(s) to the transformer core frame may comprise affixing the first reinforcement panel(s) and/or the second reinforcement panel(s) to an inner surface of the bottom wall.

Affixing the reinforcement panel(s) to the transformer core frame may comprise affixing first reinforcement panel(s) to an outer surface of the first side wall.

Affixing the reinforcement panel(s) to the transformer core frame may comprise affixing second reinforcement panel(s) to an outer surface of the second side wall.

Reinforcement panel(s) comprising a honeycomb core may be attached to the inner or outer surfaces of the bottom and top walls of the transformer core frame.

Each one of the one or several reinforcement panels respectively may be a composite sandwich panel comprising first and second skin layers, with the honeycomb structure sandwiched between the first and second skin layers. Affixing the reinforcement panel(s) to the transformer core frame may comprise affixing the reinforcement panel(s) such that one of the skin layers is in tight abutment with the transformer core frame.

Each of the one or several reinforcement panels may have only one skin layer. Affixing the reinforcement panel(s) to the transformer core frame may comprise affixing the reinforcement panel(s) such that the honeycomb structure is sandwiched between the skin layer and the transformer core frame. The honeycomb structure may directly abut on the transformer core frame or may be arranged such that only an adhesive layer (but no skin layer) is arranged between the honeycomb structure and the transformer core frame.

The structure that defines a plurality of cells, such as the honeycomb structure of the reinforcement panel(s) has walls defining a plurality of cells. The walls extend along an axis and have a hexagonal shape in plan view along the axis.

Affixing the reinforcement panel(s) may comprise arranging the reinforcement panel(s) such that the axis along which the honeycomb cells extend is transverse, in particular normal to, a major surface of the side wall, bottom wall, or top wall of the transformer core frame to which the reinforcement panel is affixed.

The method may comprise filling cells of the honeycomb structure with a liquid, in particular an insulation liquid, in particular an insulation oil.

The method may comprise allowing gas to exit the cells of the honeycomb structure as the cells are filled with the liquid, in particular an insulation liquid, in particular an insulation oil.

Filling the cells with the liquid may comprise allowing the liquid to pass through fluid communication openings in the walls of the honeycomb structure.

The fluid communication openings may comprise first fluid communication openings that fluidly communicate adjacent cells of the honeycomb structure of a reinforcement panel and that are provided in internal walls of the honeycomb structure.

The fluid communication openings may comprise second fluid communication openings that are adapted to fluidly communicate cells of the honeycomb structure of a reinforcement panel with cells of the honeycomb structure of another reinforcement panel or with a liquid-containing volume of a transformer tank.

The cells may be filled with the insulation liquid after the reinforcement panel(s) have been attached to the transformer core frame.

The cells may be filled with the insulation liquid when a transformer tank in which the reinforced transformer tank frame is mounted is filled with the insulation liquid.

According to an embodiment of the invention, a use of one or several reinforcement panels comprising a honeycomb structure and affixed to a transformer core frame for preventing crack formation in the reinforced transformer core frame when short circuit testing is performed.

The use may comprise forming the reinforced transformer core frame according to any one of the embodiments disclosed herein.

Various effects are attained by the reinforced transformer core frame and the methods according to the invention. The risk of crack formation in transformer core frames during short circuit testing is reduced. The composite reinforcement panels have a good stiffness per weight characteristics, thereby attaining the enhanced stability against crack formation during testing with a lower weight increase as compared to the use of solid steel reinforcement plates welded to the sides of a metal transformer core frame. The composite reinforcement panels may be pre-fabricated and may be attached to the transformer core frame as integral units by efficient techniques such as riveting or gluing, which provides ease of manufacture.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF EMBODIMENTS

Example embodiments of the invention will be described with reference to the drawings in which identical or similar reference signs designate identical or similar elements. While some embodiments will be described in the context of a distribution transformer, the embodiments are not limited thereto. The features of embodiments may be combined with each other, unless specifically noted otherwise.

According to embodiments of the invention, composite panels having a structure that defines a plurality of cells, such as a honeycomb structure, and at least one skin layer attached to the honeycomb structure are used as reinforcement affixed to side walls (i.e., the shorter walls) of a transformer core frame.

Figure 1:
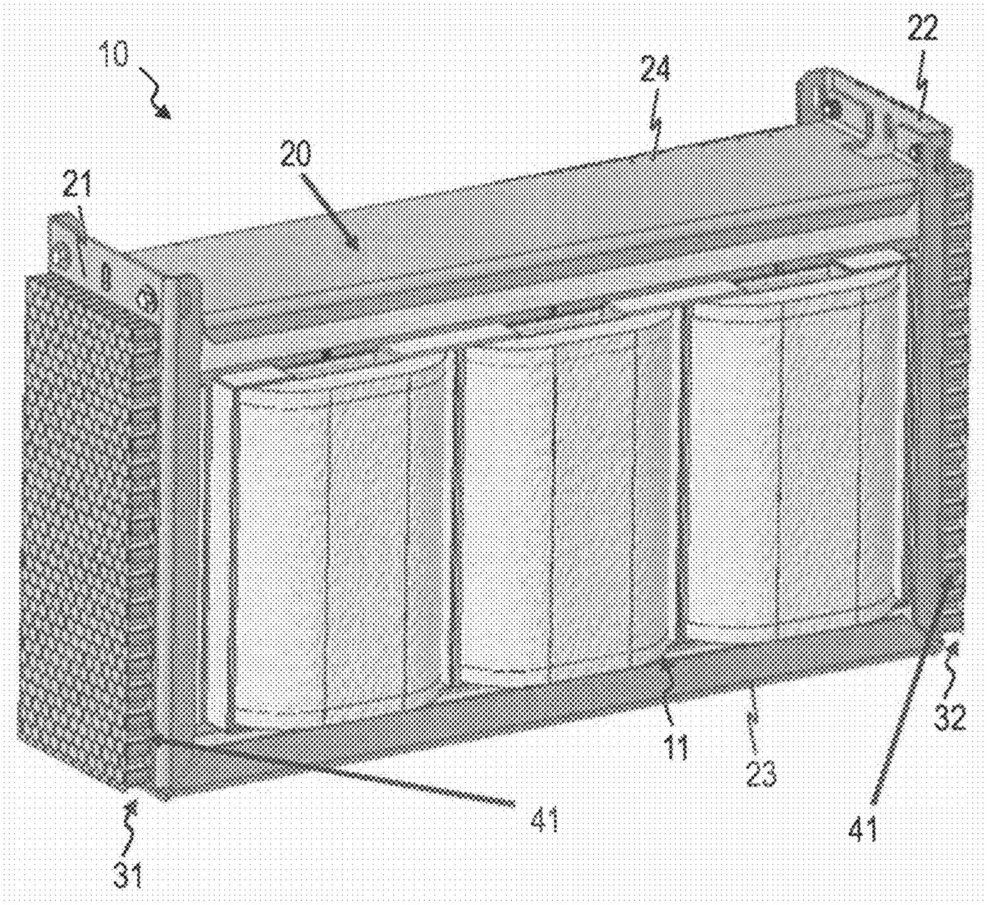
FIG. 1 is a schematic view of a reinforced transformer core frame according to an embodiment and a wound core received therein.

FIG. 1 shows a partial view of a transformer 10 having a transformer core frame 20 and a wound core 11. The wound core 11 has various yokes. The transformer core frame 20 has a first side wall 21, a second side wall 22, a bottom wall 23 and a top wall 24. The transformer core frame 20 may be operative to clamp and compress yokes of the core at the top and bottom, thereby holding the core together. The transformer core frame 20 may be made of metal, in particular stainless steel.

Without any reinforcement of the transformer core frame 20, some of the walls of the transformer core frame 20 may be subject to the risk of crack formation when the active part of the transformer exerts electro-dynamical forces onto the transformer core frame 20. This applies in particular to situations such as short circuit testing, where the shorter walls, i.e., the side walls 21, 22, may be prone to exhibiting crack formation.

For improved stability and in order to mitigate the risk of such crack formation, a first reinforcement panel 31 is affixed to the first side wall 21 and a second reinforcement panel 32 is affixed to the second side wall 22. While only a single reinforcement panel 31, 32 is shown on each of the side walls 21, 22, plural separate reinforcement panels may be affixed to one side wall. The reinforcement panel(s) may be attached on one or several of the side walls 21, 22, the bottom wall 23, and/or the top wall 24, as will be explained in more detail below.

The transformer core frame 20 with the reinforcement panels 31, 32 affixed thereto is also referred to as "reinforced transformer core frame" herein.

The reinforcement panels 31, 32 respectively are composite panels having a honeycomb structure and at least one skin layer adhered to the honeycomb structure. The reinforcement panels 31, 32 may have a sandwich configuration with two skin layers (as will be explained in more detail with reference to FIGS. 2A and 2B) or with just one skin layer that sandwiches the honeycomb structure between the skin layer and a surface of one of the walls of the transformer core frame (as will be explained in more detail with reference to FIGS. 3A and 3B).

The reinforcement panels 31, 32 may be affixed to the side walls 21, 22 of the transformer core frame by means of rivets, bolts, welds, and/or by means of adhesive.

Figure 2A:
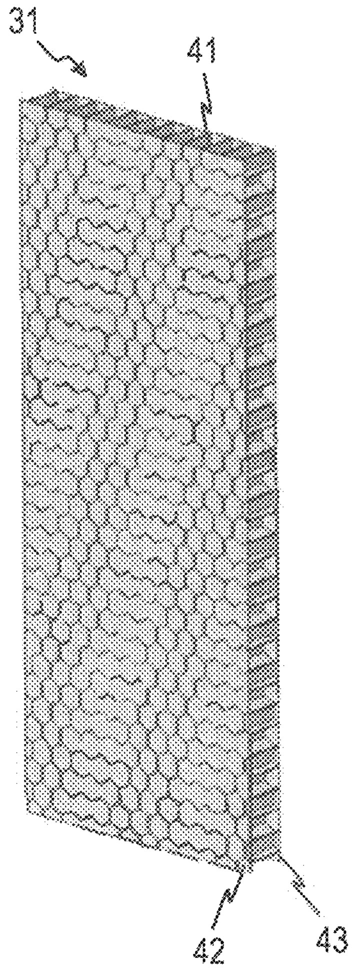
FIG. 2A is a schematic view of a reinforcement panel that may be used in embodiments of the invention, and FIG. 2B a schematic partial view of a reinforced transformer core frame that comprises the reinforcement panel.

FIG. 2A is a perspective view of a reinforcement panel 31. The reinforcement panel 31 with the structure depicted in FIG. 2A may be affixed on plural walls of the transformer core frame, such as side walls 21, 22, bottom wall 23, and/or top wall 24.

The reinforcement panel 31 has a two skin layers 42, 43 provided on opposite sides in the width direction of the reinforcement panel 31. The honeycomb structure 41 is sandwiched between the skin layers 42, 43. The skin layers 42, 43 may be attached to the honeycomb structure 41 (which is a honeycomb core sandwiched between the skin layers) by an adhesive layer, without being limited thereto.

Figure 2B:
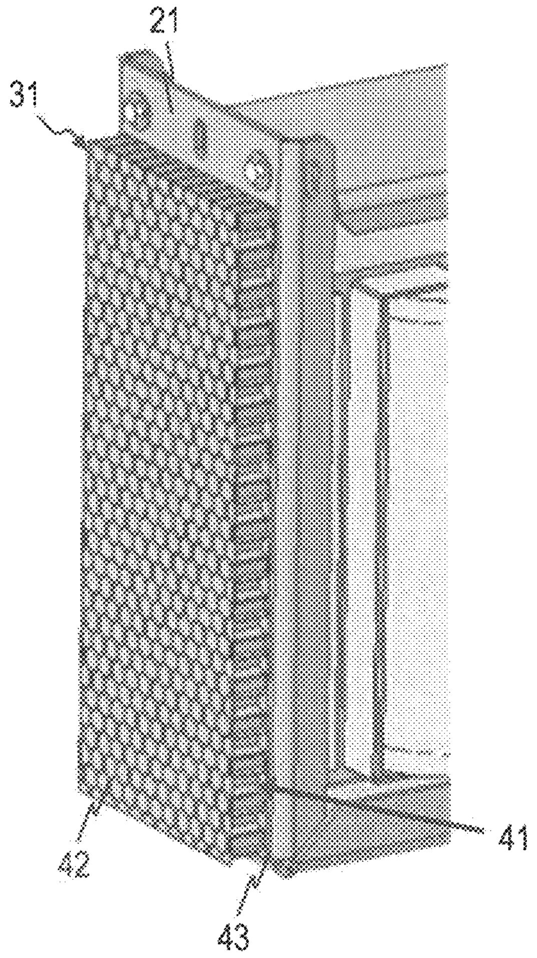

FIG. 2B is a perspective partial view of the reinforced transformer core frame, in which the reinforcement panel 31 is affixed to the side wall 21 such that the skin layer 43 is in close abutment with the side wall 21 along the planar extension of the skin layer 43.

The reinforcement panel 31 having two skin layers 42, 43 may be affixed to the side wall 21 by riveting, bolting, welding or gluing, for example.

Figure 3A:
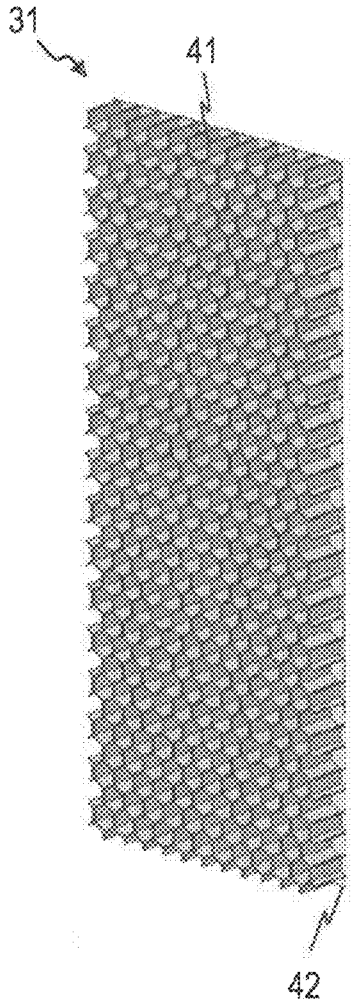
FIG. 3A is a schematic view of a reinforcement panel that may be used in embodiments of the invention, and FIG. 3B a schematic partial view of a reinforced transformer core frame that comprises the reinforcement panel.

FIG. 3A is a perspective view of a reinforcement panel 31. The reinforcement panel 31 with the structure depicted in FIG. 3A may be affixed on plural walls of the transformer core frame, such as side walls 21, 22, bottom wall 23, and/or top wall 24. The reinforcement panel 31 has a single skin layer 42 attached to the honeycomb structure 41 by an adhesive layer, without being limited thereto.

Figure 3B:
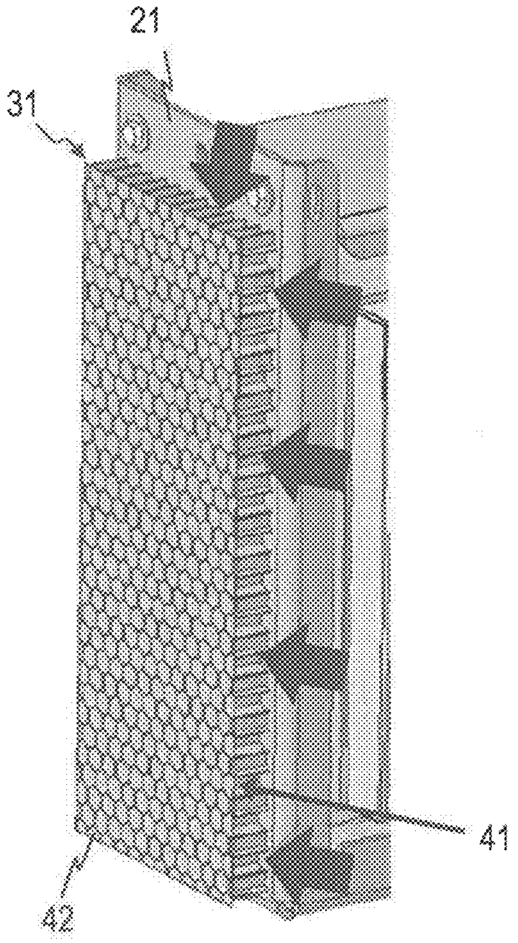

FIG. 3B is a perspective partial view of the reinforced transformer core frame, in which the reinforcement panel 31 is affixed to the side wall 21 such that the skin layer 42 and the side wall 21 sandwich the honeycomb structure 41 therebetween.

The reinforcement panel 31 having a single skin layer 42 may be affixed to the side wall 21 using an adhesive or using other techniques. In the reinforced transformer core frame structure, the honeycomb structure 41 is adhered to the side wall 21 such that no skin layer is interposed between the honeycomb structure 41 and the side wall 21. Other techniques may be used for attaching the honeycomb structure 41 to the side wall 21, such as riveting, bolting, or welding.

It will be appreciated that, when using panels having a single skin layer only, the side wall 21 of the transformer core frame operates to sandwich the honeycomb structure 41 between the side wall 21 and the skin layer 42. As indicated by solid black arrows in FIG. 3B, the side wall 21 may act as an axial end face of the cells of the honeycomb structure. I.e., the side wall 21 of the transformer core frame itself has a function that is similar to that of a skin layer opposing the skin layer 42 of the reinforcement panel 31.

While FIGS. 1 to 3 are views of reinforced transformer core frames in which the reinforcement panel is affixed on an outer side of the reinforced transformer core frame, reinforcement panels comprising a honeycomb structure may alternatively or additionally be affixed on an inner side of the reinforced transformer core frame.

Figure 4:
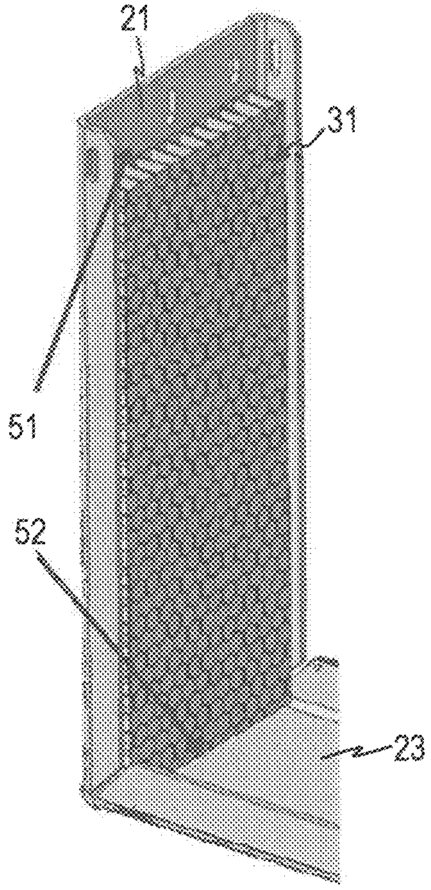
FIG. 4 is a schematic partial view of a reinforced transformer core frame according to an embodiment.

FIG. 4 is a schematic partial view of a reinforced transformer core frame, with a reinforcement panel 31 being affixed to an inner surface of the first side wall 21. A similar construction may be used on the opposite second side wall 22 (not shown in FIG. 4). The reinforcement panel 31 may be affixed to the inner surface of the side wall 21 by riveting and/or gluing. A fixation area 51 between the reinforcement panel 31 and the side wall 21 may be formed along the major face of the reinforcement panel 31.

The reinforcement panel 31 may optionally also be affixed to an inner surface of the bottom wall 23 and/or an inner surface of the top wall 24. A further fixation area 52 between the reinforcement panel 31 and the bottom wall 23 may be formed along a minor face of the reinforcement panel 31.

Alternatively or additionally, a further fixation area between the reinforcement panel 31 and the top wall 24 may be formed along another minor face of the reinforcement panel 31.

When the reinforcement panel 31 is provided on the inner side of the transformer core frame, it can act as an interconnection between side and bottom walls, further increasing robustness of the construction.

The side wall 21 has a planar major portion and integral bent edge portions that extend transversely to the planar major portion along the vertical edges of the planar major portion. Part or all of the reinforcement panel 31 may be arranged between the bent edge portions of the side wall 21.

The bottom wall 23 may a planar major portion and integral bent edge portions that extend transversely to the planar major portion, and part of the reinforcement panel 31 may be arranged between the bent edge portions of the bottom wall 23.

Part or all of the reinforcement panel 31 may be made of an electrically insulating material. For illustration, one or two skin layers and/or the honeycomb structure may be made of an electrically insulating material. In some examples, only the skin layer closer to the wound core (but not the skin layer closer to the side wall 21) may be made of an electrically insulating material. The use of insulating materials in the reinforcement panel 31 allows the reinforcement panel 31 to also provide electrical insulation. The amount of conventional insulating materials that are normally provided, such as pressboards, on the inner sides of the transformer core frame may thereby be reduced or eliminated along the side walls 21, 22.

Various materials can be used for skins and/or of the cores of the composite panel 31. For illustration, the honeycomb structure 41 may comprise or may be formed of at least one of: aluminum, stainless steel, Nomex®, Kevlar®, polypropylene, polycarbonate, without being limited thereto. The at least one skin layer 42, 43 may comprise or may be formed of at least one of: aluminum, stainless steel, high pressure laminate, glass/epoxy prepreg, fiberglass, without being limited thereto. The at least one skin layer 42, 43 may be adhered to the honeycomb structure 41 using an adhesive that is commercial grade toughened epoxy or modified epoxy film adhesive. It will be appreciated that these materials are only exemplary.

The characteristics of the reinforcement panel(s) 31, 32 may be customized by appropriately dimensioning the skin layers (e.g., skin layer thickness) and/or the honeycomb structure (e.g., the wall thickness, the cross-sectional area of the honeycomb cells, and/or the length of the honeycomb cells) and/or by appropriate selection of materials.

It will be appreciated that the reinforcement panel(s) 31, 32 may be selected according to the transformer rating and may be pre-manufactured for subsequent affixation to the transformer core frame. This allows few sizes of ready-made reinforcement panels to be stocked and used in modular fashion. In this case, several reinforcement panels (e.g., two, three, four, or more than four reinforcement panels) may be attached to a first side wall 21 of the transformer core frame, and several additional reinforcement panels (e.g., two, three, four, or more than four reinforcement panels) may be attached to a second side wall 22 of the transformer core frame.

The types and numbers of reinforcement panels to be used may be selected in accordance with the transformer specifications, e.g., in dependence on the transformer rating.

The walls defining the honeycomb cells of the reinforcement panel(s) may be provided with fluid communication openings. The fluid communication openings may allow a liquid to enter into the cells, preferably all cells, of the honeycomb structure while allowing gas to exit the cells of the honeycomb structure.

Preferably, for each cell of the reinforcement panel(s), the wall surrounding the cell has at least one, preferably at least two fluid communication openings. The wall surrounding the cell may consist of six essentially rectangular panels that are angled relative to each other to form the hexagonal cell, and one or more fluid communication openings may be provided in each one of the six panels.

Figure 5:
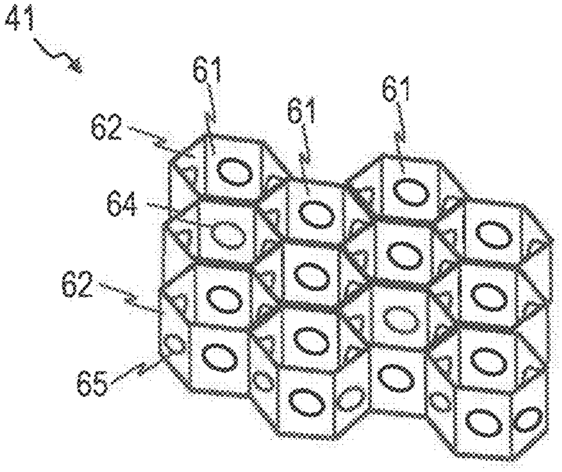
FIG. 5 is a schematic partial perspective view of a reinforcement structure of a reinforced transformer core frame according to an embodiment.

FIG. 5 shows a honeycomb structure 41 of a reinforcement panel. It will be appreciated the honeycomb structure 41 as described with reference to FIG. 5 may be used for any reinforcement panel, e.g., on reinforcement panel(s) 31 affixed to the side walls 21, 22, bottom wall 23, and/or top wall 24.

The honeycomb structure 41 has walls 61, 62 defining the hexagonal cells. Fluid communication openings 64, 65 are formed in the walls 61, 62.

The fluid communication openings may include fluid communication openings 64 that allow an insulation liquid to pass between adjacent cells in the honeycomb structure of the same reinforcement panel.

The fluid communication openings may include fluid communication openings 65 provided in outer walls 62 of the honeycomb structure 41 that allow the insulation liquid to pass from a cell in the honeycomb structure of the same reinforcement panel to a cell in an adjacent reinforcement panel.

The fluid communication openings 64, 65 do not only allow insulation liquid to enter the cells and/or to pass between the cells, but also allow gas that may initially be contained within the cells to exit the reinforcement panel.

In this way, the stability of the reinforcement structure may be further enhanced by reducing, in particular essentially eliminating, a hydrostatic pressure difference between the inside and outside of a reinforcement panel. The hydrostatic pressure present at any location on the inner surface of a skin layer may be caused to become equal to the hydrostatic pressure present at the corresponding location on the outer surface of the skin layer.

Figure 6:
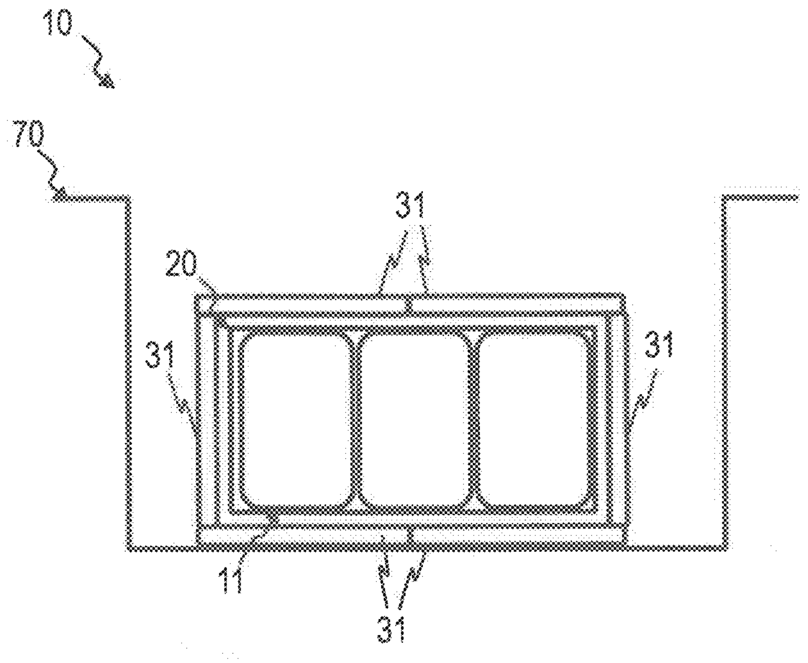
FIG. 6 is a schematic cross-sectional view of a transformer comprising a reinforced transformer core frame according to an embodiment.

FIG. 6 shows a transformer 10 comprising a reinforced transformer core frame according to an embodiment. The transformer 10 has a tank 70. The reinforced transformer core frame having the transformer core frame 20 and the reinforcement panels 31 attached thereto is positioned in the tank. The reinforcement panels 31 may be affixed to the side, bottom and/or top walls of the transformer core frame 20.

The reinforcement panel(s) 31 includes a honeycomb structure that has walls defining the hexagonal cells, with fluid communication openings being formed in the walls. The fluid communication openings may communicate, directly or indirectly, the interior of all cells of the honeycomb structure with the tank volume surrounding the reinforcement panel(s).

When the tank 70 is filled with an insulation liquid, the insulation liquid enters the cells of the honeycomb structure. Concurrently, gas (typically air) is driven out from the cells of the honeycomb structure. An equalization in hydrostatic pressure can be attained, such that the pressure differential in hydrostatic pressure across the skin layer of the reinforcement panel is equal to zero.

Various effects and advantages are attained by the reinforced transformer core frame, the method, and the use according to the invention.

A weight reduction can be attained compared to stiffeners conventionally considered for reinforcing transformer core frames. It will be appreciated that the weight reduction is particularly pronounced in the state in which the reinforced transformer core frame is mounted in a transformer tank, and the cells of the honeycomb core are still filled with gas. This is an important advantage, because the weight reduction is pronounced in the state in which the transformer core frame may have to be transported and/or handled for assembly.

The assembly of the reinforcement panels to the transformer core frame is simplified. This applies in particular when riveting or bolting is used for affixing the reinforcement panels to the transformer core frame.

When the reinforcement panels are placed on the inner side of the transformer core frame and are affixed thereto by, e.g., gluing, an interconnection between bottom and side walls of the frame can be assured, leading to a further increase in stiffness. Further, a skin of the reinforcement panel facing towards the wound core and, optionally, the honeycomb structure and/or the other skin, may be formed from insulating material, allowing the conventional pressboard insulation along the side walls to be reduced or eliminated.

The reinforced transformer core frame can be applicable to all wound core frames types, where additional reinforcement is desired. Embodiments of the invention may be used for, e.g., distribution transformers.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A reinforced transformer core frame, comprising:

a transformer core frame; and a reinforcement structure, the reinforcement structure comprising at least one reinforcement panel comprising a honeycomb structure and affixed to the transformer core frame, wherein the honeycomb structure has walls that define a plurality of cells, each of the walls including at least one fluid-communication opening that places the cells in fluid communication with neighboring cells and with an exterior volume of a liquid so that, when the reinforced transformer core frame is immersed in the liquid, the liquid passively floods the cells and any trapped gas vents from the cells without use of a pump.

2. The reinforced transformer core frame of claim 1, wherein the transformer core frame has a first side wall, a second side wall, a top wall, and a bottom wall, and wherein the at least one reinforcement panel comprises a first reinforcement panel comprising the honeycomb structure affixed to the first side wall and a second reinforcement panel comprising the honeycomb structure affixed to the second side wall.

3. The reinforced transformer core frame of claim 2, wherein the first reinforcement panel is affixed to an inner surface of the first side wall and the second reinforcement panel is affixed to an inner surface of the second side wall.

4. The reinforced transformer core frame of claim 3, wherein the first reinforcement panel and the second reinforcement panel abut on an inner surface of the bottom wall or an inner surface of the top wall.

5. The reinforced transformer core frame of claim 2, wherein the first reinforcement panel is affixed to an outer surface of the first side wall and the second reinforcement panel is affixed to an outer surface of the second side wall.

6. The reinforced transformer core frame of claim 1, wherein each of the at least one reinforcement panel comprises at least one skin layer adhered to the honeycomb structure.

7. The reinforced transformer core frame of claim 6, wherein each of the at least one reinforcement panel is a composite sandwich panel comprising first and second skin layers, with the honeycomb structure sandwiched between the first and second skin layers.

8. The reinforced transformer core frame of claim 6, wherein each of the at least one reinforcement panel has only one skin layer arranged such that the honeycomb structure is sandwiched between the skin layer and the transformer core frame.

9. The reinforced transformer core frame of claim 8, wherein the at least one reinforcement panel are affixed to the transformer core frame by rivets, bolts, welds or by an adhesive.

10. A transformer, comprising:

a wound core, and the reinforced transformer core frame of claim 1 that surrounds the wound core and on which the wound core is supported.

11. The reinforced transformer core frame of claim 1, wherein the at least one reinforcement panel comprising a plurality of reinforcement panels, each reinforcement panel comprising the honeycomb structure and affixed to the transformer core frame.

12. The reinforced transformer core frame of claim 3, wherein the first reinforcement panel and the second reinforcement panel are affixed to the inner surface of the bottom wall or the inner surface of the top wall.

13. The reinforced transformer core frame of claim 1, wherein the liquid comprises a transformer insulation liquid.

14. The reinforced transformer core frame of claim 13, wherein the transformer insulation liquid comprises an insulation oil.

15. The transformer of claim 10, further comprising a tank in which the liquid is disposed, wherein the reinforced transformer core frame is positioned within the tank and cells of the honeycomb structure are at least partially filled with the liquid.

16. The reinforced transformer core frame of claim 1, wherein the honeycomb structure comprises a plurality of hexagonal cells.

* * * * *